United States Patent
Sudo et al.

(10) Patent No.: US 12,078,371 B2
(45) Date of Patent: Sep. 3, 2024

(54) TEMPERATURE SENSING SYSTEM, PROCESSING METHOD, AND PROGRAM

(71) Applicant: Panasonic Intellectual Property Management Co., Ltd., Osaka (JP)

(72) Inventors: Ryota Sudo, Aichi (JP); Takanori Sugiyama, Osaka (JP); Takaaki Hiramatsu, Osaka (JP); Nobuaki Shimamoto, Fukui (JP); Hiroshi Yamanaka, Fukui (JP); Naoki Kobayashi, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 463 days.

(21) Appl. No.: 17/437,640

(22) PCT Filed: Feb. 17, 2020

(86) PCT No.: PCT/JP2020/006122
§ 371 (c)(1),
(2) Date: Sep. 9, 2021

(87) PCT Pub. No.: WO2020/184077
PCT Pub. Date: Sep. 17, 2020

(65) Prior Publication Data
US 2022/0252458 A1    Aug. 11, 2022

(30) Foreign Application Priority Data
Mar. 12, 2019    (JP) ................. 2019-045213

(51) Int. Cl.
F24F 11/46    (2018.01)
F24F 11/63    (2018.01)
(Continued)

(52) U.S. Cl.
CPC ............. *F24F 11/46* (2018.01); *F24F 11/63* (2018.01); *F24F 11/74* (2018.01); *F24F 11/80* (2018.01);
(Continued)

(58) Field of Classification Search
CPC ................................ G01J 5/485; G01K 7/427
See application file for complete search history.

(56) References Cited

U.S. PATENT DOCUMENTS

2012/0040601 A1    2/2012   Harayama
2013/0166241 A1    6/2013   Hamann et al.
(Continued)

FOREIGN PATENT DOCUMENTS

JP    H0579675 A   *   3/1993
JP    H07-027395 A       1/1995
(Continued)

OTHER PUBLICATIONS

International Search Report and Written Opinion issued in International Patent Application No. PCT/JP2020/006122, mailed on Mar. 31, 2020; with partial English translation.

*Primary Examiner* — Mirellys Jagan
(74) *Attorney, Agent, or Firm* — Rimon P.C.

(57) ABSTRACT

A temperature sensing system senses a temperature in the monitor space. The temperature sensing system includes a first detector, a second detector, and a processing unit. The first detector detects a temperature on a ceiling and outputs first information about the temperature on the ceiling. The second detector detects infrared radiation emitted from a floor and outputs second information about the infrared radiation from the floor. The processing unit calculates, based on at least the first information and the second information, a spatial temperature distribution which
(Continued)

includes a component in a height direction with respect to the monitor space between the ceiling and the floor.

14 Claims, 8 Drawing Sheets

(51) Int. Cl.
- *F24F 11/74* (2018.01)
- *F24F 11/80* (2018.01)
- *F24F 110/10* (2018.01)
- *G01J 5/00* (2022.01)
- *G01J 5/14* (2006.01)
- *G01J 5/48* (2022.01)
- *G01K 1/14* (2021.01)
- *G01K 7/42* (2006.01)

(52) U.S. Cl.
CPC . *G01J 5/14* (2013.01); *G01J 5/48* (2013.01); *G01J 5/485* (2022.01); *G01K 1/14* (2013.01); *G01K 7/427* (2013.01); *F24F 2110/10* (2018.01); *G01J 5/0025* (2013.01); *G01K 2213/00* (2013.01)

(56) References Cited

U.S. PATENT DOCUMENTS

| | | | |
|---|---|---|---|
| 2014/0010263 A1* | 1/2014 | Hosoi | G01J 5/12 374/137 |
| 2016/0109148 A1* | 4/2016 | Honda | G01J 5/025 702/135 |
| 2019/0285300 A1 | 9/2019 | Kwong et al. | |
| 2019/0360718 A1 | 11/2019 | Ozaki | |

FOREIGN PATENT DOCUMENTS

| | | |
|---|---|---|
| JP | H08-128704 A | 5/1996 |
| JP | 2009-257617 A | 11/2009 |
| JP | 2012-215403 A | 11/2012 |
| JP | 5525960 B2 | 6/2014 |
| JP | 2014-126302 A | 7/2014 |
| JP | 5674193 B2 | 2/2015 |
| JP | 2018-200252 A | 12/2018 |
| KR | 10-1720226 B1 | 3/2017 |
| WO | 2018/179750 A1 | 10/2018 |
| WO | 2019/188375 A1 | 10/2019 |

\* cited by examiner

TEMPERATURE SENSING SYSTEM, PROCESSING METHOD, AND PROGRAM

CROSS-REFERENCE OF RELATED APPLICATIONS

This application is the U.S. National Phase under 35 U.S.C. § 371 of International Patent Application No. PCT/JP2020/006122, filed on Feb. 17, 20020, which in turn claims the benefit of Japanese Application No. 2019-045213, filed on Mar. 12, 2019, the entire disclosures of which Applications are incorporated by reference herein.

TECHNICAL FIELD

The present disclosure generally relates to a temperature sensing system, a processing method, and a program. More particularly, the present disclosure relates to a temperature sensing system for sensing a temperature in a monitor space, a processing method concerned with a temperature distribution in the temperature sensing system, and a program.

BACKGROUND ART

A known exemplary air conditioning system is disclosed in Patent Literature 1. The air conditioning system of Patent Literature 1 attempts to estimate, based on either a shape of a high-temperature region acquired based on the sensor output of an infrared sensor or a variation in its shape with time, for example, the posture of a person who is present within an indoor space, and calculates a feel-like temperature of the person at a height corresponding to the posture thus estimated with some accuracy. In addition, the air conditioning system further includes a control means for controlling an air conditioner based on the feel-like temperature calculated.

CITATION LIST

Patent Literature

Patent Literature 1: JP 2014-126302 A

SUMMARY OF INVENTION

Considering an overall temperature circumstance within the indoor space (monitor space), the air conditioning system of Patent Literature 1 may be unable to sense a temperature within the indoor space accurately enough simply by estimating the posture of the person in the room to calculate his or her feel-like temperature.

In view of the foregoing background, it is therefore an object of the present disclosure to provide a temperature sensing system, a processing method, and a program, all of which contribute to increasing accuracy in sensing a temperature in a monitor space.

A temperature sensing system according to an aspect of the present disclosure senses a temperature in a monitor space. The temperature sensing system includes a first detector, a second detector, and a processing unit. The first detector detects a temperature on a ceiling and outputs first information about the temperature on the ceiling. The second detector detects infrared radiation emitted from a floor and outputs second information about the infrared radiation from the floor. The processing unit calculates, based on at least the first information and the second information, a spatial temperature distribution which includes a component in a height direction with respect to the monitor space between the ceiling and the floor.

A processing method according to another aspect of the present disclosure is for use to perform processing on a temperature distribution in a temperature sensing system for sensing a temperature in a monitor space. The processing method includes a calculation step of calculating, based on at least first information and second information, a spatial temperature distribution which includes a component in a height direction with respect to the monitor space between a ceiling and a floor. The first information is detection information about a temperature on the ceiling. The second information is detection information about infrared radiation emitted from the floor.

A program according to still another aspect of the present disclosure is designed to cause a computer system to perform the processing method described above.

DESCRIPTION OF EMBODIMENTS

(1) Overview

The drawings to be referred to in the following description of embodiments are all schematic representations. Thus, the ratio of the dimensions (including thicknesses) of respective constituent elements illustrated on the drawings does not always reflect their actual dimensional ratio.

Figure 5:
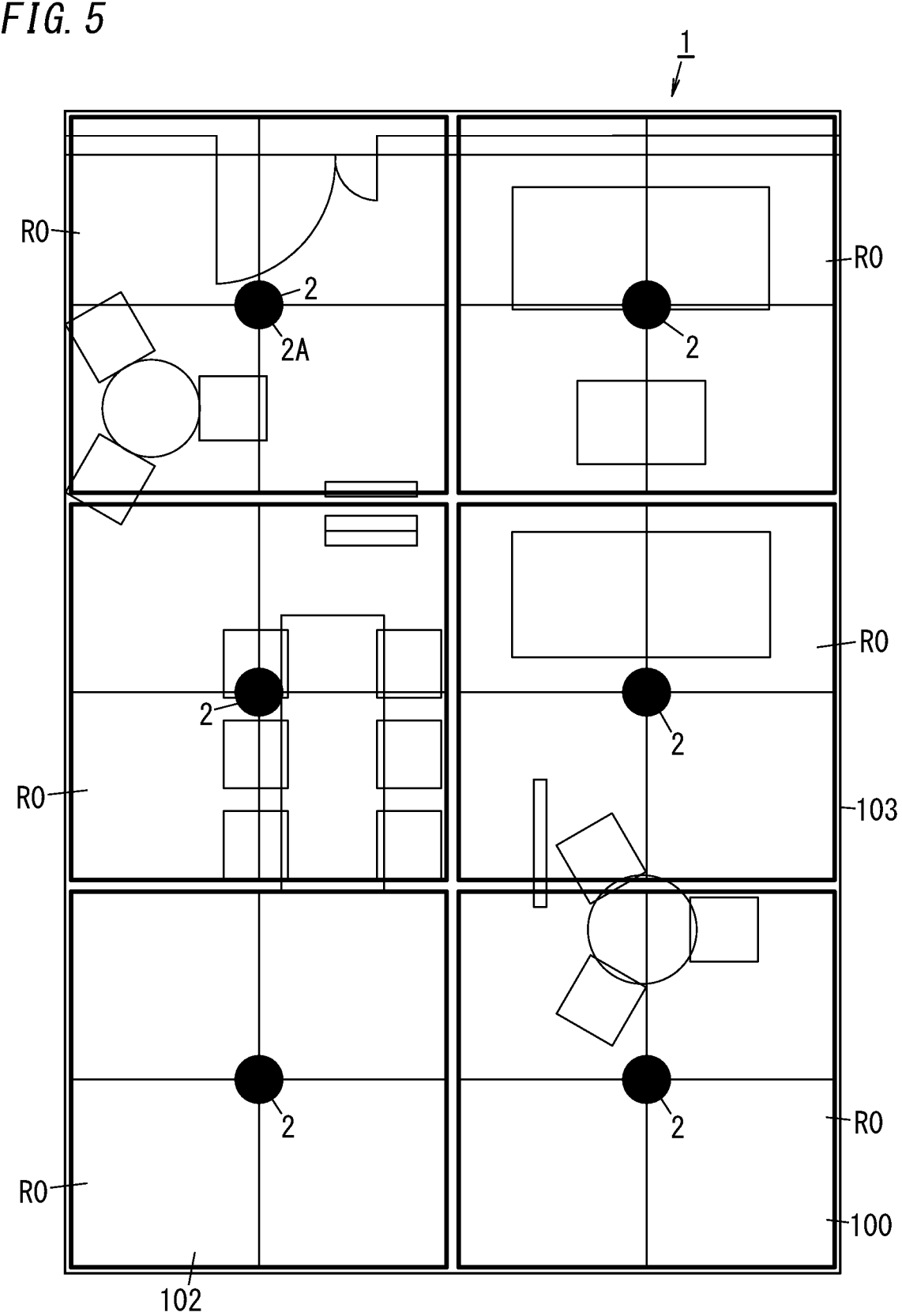
FIG. 5 is a conceptual diagram (floor plan) illustrating a case where a plurality of sensing units of the temperature sensing system are installed in a monitor space.

A temperature sensing system 1 (see FIG. 3) according to this embodiment is configured to sense a temperature (temperature circumstance) in a monitor space 100 (see FIG. 5). As used herein, the "temperature circumstance" refers to a circumstance of a temperature that varies due to a variation in environment which may include a person who is present within the monitor space 100. Suppose that a temperature sensing result obtained by the temperature sensing system 1 is applied, for example, to a temperature control, an airflow direction control, an airflow rate control, and other types of control by an air conditioning system 5 (see FIG. 3) which includes one or a plurality of air conditioners 51. Specifically, the sensing result may be used as a control temperature for a feedback control to be performed to make the temperature in the monitor space 100 closer to a temperature setting (target temperature) defined for the air conditioner(s) 51.

The sensing result obtained by the temperature sensing system 1 may be applied to not only the control of the air conditioner(s) 51 but also other types of control such as an operation control of a circulator or an exhaust fan, and an opening/closing control of an electric window (shutter).

Figure 1A:
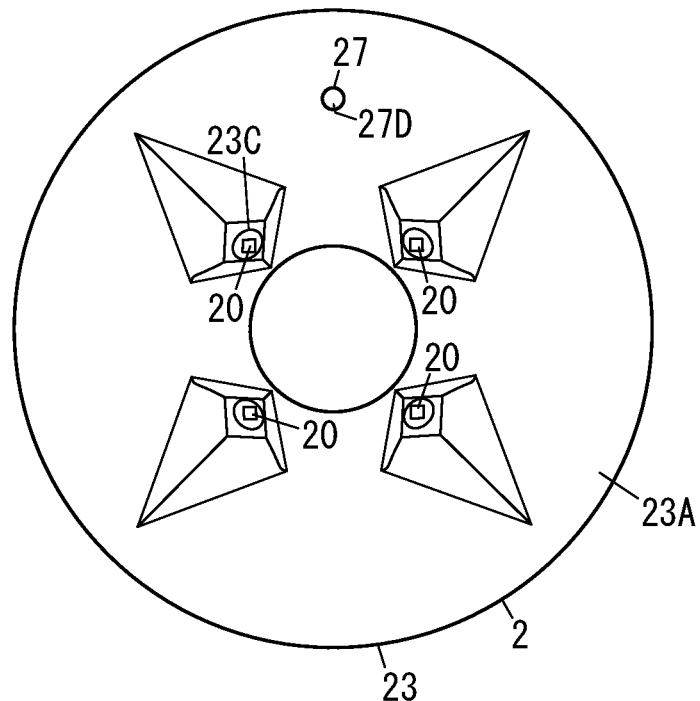
FIG. 1A is a bottom view of a sensing unit of a temperature sensing system according to an exemplary embodiment.
Figure 1B:
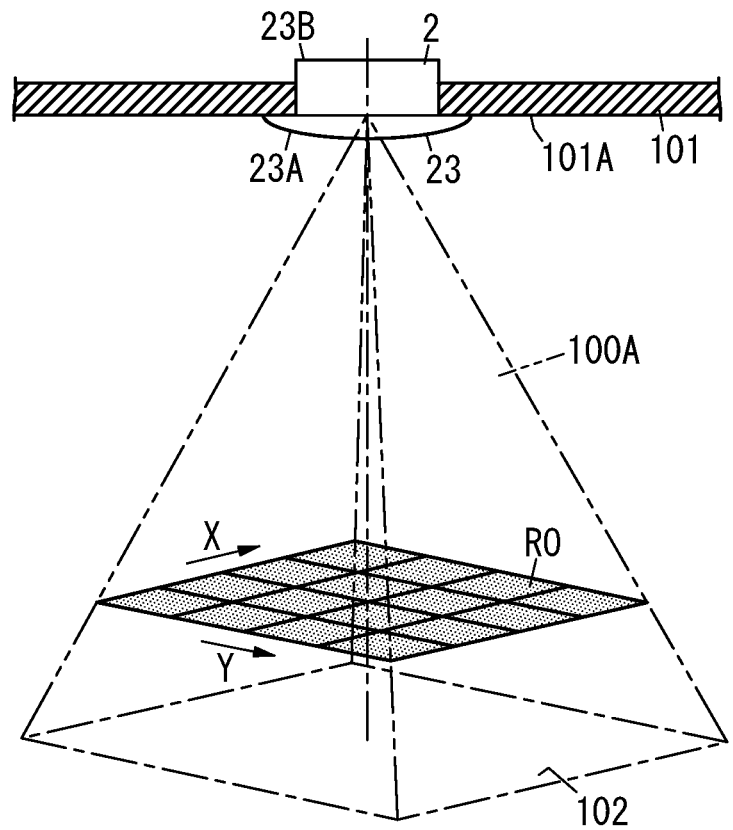
FIG. 1B is a conceptual diagram illustrating a sensing area of the sensing unit.

The monitor space 100 may be, for example, a space between the ceiling 101 and floor 102 in a facility (see FIG. 1B). In the following description, the facility is supposed to be an office building. However, this is only an example and should not be construed as limiting. Alternatively, the facility may also be a store, a theater, a movie theater, a public hall, an amusement facility, a complex facility, a restaurant, a department store, a school, a hotel, an inn, a hospital, a nursing home for the elderly, a kindergarten, a library, a museum, an art museum, an underground shopping mall, a railway station, or an airport. The facility does not have to be one of non-residential facilities such as these but may be a single-family dwelling house or a multi-family dwelling house (so-called "mansion" (which means a condominium) in Japan) as well.

Figure 2:
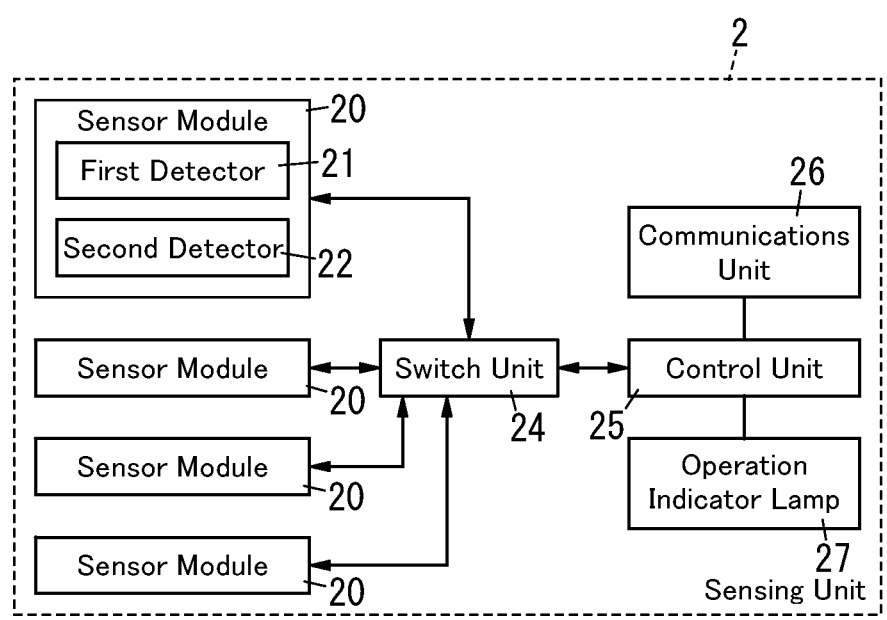
FIG. 2 is a schematic block diagram illustrating a configuration of the sensing unit.
Figure 3:
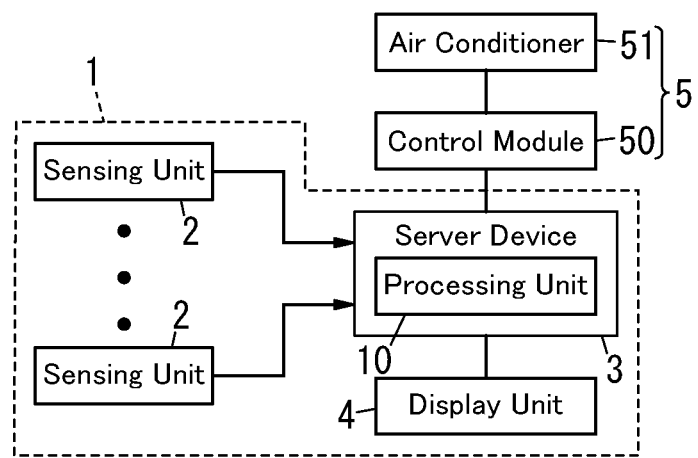
FIG. 3 is a schematic block diagram illustrating an overall configuration of the temperature sensing system.

The temperature sensing system 1 includes a first detector 21 (see FIG. 2), a second detector 22 (see FIG. 2) and a processing unit 10 (see FIG. 3). The first detector 21 is configured to detect a temperature on the ceiling 101 (see FIG. 1B) and output first information about the temperature. The second detector 22 is configured to detect infrared radiation emitted from the floor 102 (see FIG. 1B) and output second information about the infrared radiation. The processing unit 10 is configured to calculate, based on at least the first information and the second information, a spatial temperature distribution which includes a component in a height direction with respect to the monitor space 100 between the ceiling 101 and the floor 102.

According to this configuration, the spatial temperature distribution including the component in the height direction is calculated based on at least the first information and the second information, thus contributing to increasing accuracy in sensing the temperature in the monitor space 100. The temperature sensing system 1 may increase the sensing accuracy by, for example, calculating a three-dimensional spatial temperature distribution from the floor 102 to the ceiling 101.

(2) Details

An overall configuration of the temperature sensing system 1 according to this embodiment will be described in detail with reference to FIGS. 1A-5.

(2.1) Overall Configuration

As described above, the temperature sensing system 1 is configured to sense a temperature in the monitor space 100 which is an indoor space of a facility such as an office building. FIG. 5 is a floor plan of the monitor space 100 as viewed from over the ceiling 101. In the example illustrated in FIG. 5, the monitor space 100 is supposed, for the sake of convenience of description, to be an area which has a rectangular shape in a plan view, but is not limited to this.

As shown in FIG. 3, the temperature sensing system 1 includes a plurality of (six in the example illustrated in FIG. 5) sensing units 2, a server device 3, and a display unit 4. The number of the sensing unit(s) 2 provided is not limited to any particular number, but may be one. Moreover, the server device 3 is communicatively connected, via cables and/or wirelessly, to one or a plurality of external devices. The external device corresponds to, for example, a control module 50 of the air conditioning system 5 (see FIG. 3). The control module 50 may be built in each air conditioner 51 (indoor unit) installed on the ceiling 101. Alternatively, the control module 50 may also be installed on one of walls 103 (see FIG. 5) surrounding the monitor space 100 or in a caretaker's room in a facility, for example, to comprehensively control the plurality of air conditioners 51.

The air conditioning system 5 performs, in accordance with various types of information acquired from the temperature sensing system 1, temperature control for adjusting the temperature in the monitor space 100, airflow direction control for changing the airflow direction (direction of the airflow), an airflow rate control for changing the airflow rate, and other types of control. The control module 50 includes a computer system including, for example, a processor and a memory. The computer system performs the function of the control module 50 by making the processor execute a program stored in the memory. In this embodiment, the program to be executed by the processor is stored in advance in the memory of the computer system. However, this is only an example and should not be construed as limiting. The program may also be distributed after having been stored in a non-transitory storage medium such as a memory card or downloaded via a telecommunications line such as the Internet.

(2.2) Sensing Unit

First, the sensing units 2 will be described. Each sensing unit 2 is mounted on a ceiling. Specifically, as shown in FIG. 1B, each sensing unit 2 is installed to be embedded in the ceiling (member) 101, for example. Each sensing unit 2 may be held, not by the ceiling 101, but by the air conditioner 51 which is installed on the ceiling 101. Alternatively, each sensing unit 2 may also be held by a wiring duct which is provided on the ceiling. In short, a situation in which the sensing unit 2 according to the present disclosure is "mounted on a ceiling" is not limited to a situation where the sensing unit 2 is mounted on a flat ceiling surface, but may also refer to a situation where the sensing unit 2 is mounted on a structural component provided closer to the ceiling when viewed from the monitor space 100.

As shown in FIG. 2, each sensing unit 2 includes one or a plurality of (e.g., four in this embodiment) sensor modules 20, a switch unit 24, a control unit 25, a communications unit 26, an operation indicator lamp 27, and a housing 23 (see FIGS. 1A and 1B), which houses or holds all of these units.

Each sensor module 20 is a module which has various components such as a sensor chip, a lens, and a control circuit (integrated circuit) built in a package. As shown in FIG. 2, each sensor module 20, includes the first detector 21 and the second detector 22, as sensor chips.

The first detector 21 may be implemented as, for example, a temperature sensor including a temperature detecting element such as a thermistor (or a thermocouple). The first detector 21 is housed in the package of the sensor module 20 to detect a temperature within the housing 23 (specifically, in the sensor module 20). The package is formed by, for example, bonding a ceramic substrate with a conductor pattern and a metal cover. In the present disclosure, the housing 23 of the sensing unit 2 is mounted on the ceiling 101, and the first detector 21 detects the temperature within the housing 23 as the temperature on the ceiling 101. Moreover, the processing unit 10 which will be described later regards the temperature detected by the first detector 21 as the temperature on the ceiling 101. In other words, the first detector 21 is configured to detect the temperature on the ceiling 101 and output first information about the temperature to the control circuit.

The second detector 22 (infrared detector) may be implemented as, for example, an infrared array sensor in which a plurality of sensor elements (e.g., thermopiles) that sense infrared radiation are arranged two-dimensionally. In this embodiment, as an example, the second detector 22 includes sixty-four sensor elements which are two-dimensionally arranged to form an 8×8 square array in which eight sensor elements are arranged along both of the X- and Y-axes. Therefore, each sensor module 20 may make its control circuit generate, as an image data, a still thermal image in which the number of pixels arranged along each of the X- and Y-axes is eight.

The second detector 22 is housed within the package of the sensor module 20. Nevertheless, the metal cover of the package of the sensor module 20 includes a lens which condenses infrared radiation. The lens has an incident surface on which an external infrared radiation is incident, and an emergent surface through which the incident infrared radiation emerges. The second detector 22 is housed such that a photosensitive surface thereof faces the emergent surface of the lens. Furthermore, each sensor module 20 is arranged so that the lens is exposed through the housing 23.

The second detector 22 is configured to detect the infrared radiation emitted from the floor 102 of the monitor space 100 and output the second information about the infrared radiation to the control circuit. Specifically, the second information includes, for example, information about the quantity of the infrared radiation received (e.g., information about thermal energy).

As used herein, the "infrared radiation" includes, for example, (if a person is present within the monitor space 100), a light ray (heat ray) emitted from his or her body and may include light having a wavelength of around 10 μm. Each sensor module 20 makes the control circuit generate, based on the first information (absolute temperature of the sensor module 20 itself) and the second information, two-dimensional still thermal image information (image data) representing a temperature distribution in a sensing area R0 (see FIG. 1B) which is set within a predetermined viewing angle of the second detector 22. In this embodiment, the sensor module 20 indirectly measures, as its own absolute temperature, a temperature of the ceramic substrate on which a sensor chip, for example, and other components are mounted. The first information, the second information, the still thermal image information, and other types of information, generated by each sensor module 20, are output to the control unit 25 via the switch unit 24 (e.g., a multiplexer).

The sensing area R0 may be defined, for example, as a two-dimensional area having a square (e.g., 3.6 m×3.6 m) form and provided at a predetermined distance (of e.g., 1.6 m) as measured vertically from the sensing unit 2 in a state where the sensing unit 2 is installed on the ceiling 101. As shown in FIG. 1B, the sensing area R0 corresponds to the bottom of a three-dimensional viewing region (in a quadrangular pyramidal shape). This (quadrangular pyramidal) field of view range will be hereinafter sometimes referred to as a "unit space 100A".

The still thermal image information (image data) is an image generated by two-dimensionally arranging a plurality of pixels on the supposition that the values, obtained based on the information (second information) about the respective quantities of the infrared radiation received at a plurality of sensor elements and the absolute temperature (first information), are pixel values. In other words, the second information includes pieces of information about the plurality of quantities of the infrared radiation received corresponding respectively to a plurality of divisional areas (corresponds to a plurality of pixels) of the sensing area R0. Each sensor module 20 generates still thermal image information based on information representing the plurality of quantities of the infrared radiation received. The control unit 25 generates, by having output signals provided by the four sensor modules 20 sequentially switched by the switch unit 24, the still thermal image information of the overall sensing area R0 of the sensing unit 2.

The control unit 25 includes a computer system including, for example, a processor and a memory. The computer system performs the function of the control unit 25 by making the processor execute a program stored in the memory. In this embodiment, the program to be executed by the processor is stored in advance in the memory of the computer system. However, this is only an example and should not be construed as limiting. The program may also be distributed after having been stored in a non-transitory storage medium such as a memory card or downloaded via a telecommunications line such as the Internet.

The control unit 25 selects one of the four sensor modules 20 to use by controlling the switch unit 24. Specifically, as shown in FIG. 1B, the sensing area R0 is divided into 4×4 areas. The user may set, for example, by turning ON/OFF a plurality of dip switches provided in the housing 23, each of the 4×4 areas as a sensing target area or a non-sensing target area, in advance (masking setting). The control unit 25 determines, based on the ON/OFF states of the plurality of dip switches, the sensor module 20 to use, by controlling the switch unit 24.

The sensing unit 2 may sense the presence or absence of any person(s) (target 6; see FIG. 4) in/from the sensing area R0, the location of the person(s) who is/are present within the sensing area R0, and the number of the person(s) (number of people) present within the sensing area R0. The control unit 25 detects, based on the still thermal image information, the presence or absence of the person(s) in/from the sensing area R0, his, her, or their location(s) in that area, and the number of person(s) present there, and transmits the sensing results to the server device 3 (see FIG. 3) via the communications unit 26. The communications unit 26 is a communications interface for communicating with the server device 3.

Each sensing unit 2 holds its own unique address information, and also transmits the address information to the server device 3 via the communications unit 26. The address information may be stored in a memory of the control unit 25 or may be held as the ON/OFF states of the plurality of dip switches, for example.

Furthermore, the control unit 25 lights the operation indicator lamp 27 in red while sensing the person(s) (target 6). The operation indicator lamp 27 includes an LED (Light Emitting Diode), for example.

The housing 23 is formed in a generally circular cylindrical shape as a whole. The housing 23 is made up of, for example, a cover 23A which is exposed downward through the ceiling surface 101A of the ceiling 101 and a case 23B fixed to the back side of the cover 23A.

The cover 23A is, for example, a synthetic resin molded product formed in a disk shape. The cover 23A has four window holes 23C which penetrate through the housing 23 in the thickness direction. The four window holes 23C are arranged at regular intervals along the circumference of the cover 23A when the cover 23A is viewed from in front of the cover 23A. The four sensor modules 20 are housed within the housing 23 so that the lenses provided for the metal covers of the sensor modules 20 respectively face the four window holes 23C one to one. Moreover, the cover 23A further has a hole 27D to expose the operation indicator lamp 27 to the external space.

The case 23B is, for example, a synthetic resin molded product formed in a generally circular cylindrical shape. The case 23B has a mount structure which may be mounted on the ceiling 101 by having itself inserted into a hole provided through the ceiling 101. A connection terminal for communication, a power supply terminal, and other members are provided on the back side (upper side) of the case 23B. The communications unit 26 is allowed to communicate with the server device 3 by having a signal line (wired line), which is electrically connected to the server device 3, connected to the connection terminal. Alternatively, the communications unit 26 may communicate with the server device 3 wirelessly. Moreover, a power cable, which is electrically connected to an external DC power supply, is connected to the power supply terminal. This allows the sensing unit 2 to obtain operating power for the four sensor modules 20, the control unit 25, and other components thereof. The external DC power supply converts, for example, AC power supplied from a commercial AC power supply into DC power, and supplies the DC power to the sensing unit 2.

Next, an arrangement pattern of the plurality of sensing units 2 with respect to the ceiling 101 will be described with reference to FIG. 5.

FIG. 5 is a plan view of the monitor space 100 as viewed from over the ceiling 101. In the example illustrated in FIG. 5, a total of six sensing units 2 are arranged in an array to form a pattern of 3 (vertically)×2 (horizontally) sensing units. In this embodiment, as an example, the six sensing units 2 are arranged so that their sensing areas R0 do not overlap with each other. The still thermal image information of the overall monitor space 100 is obtained by having the server device 3 synthesize six pieces of still thermal image information provided by the six sensing units 2.

(2.3) Server Device

As shown in FIG. 3, the server device 3 includes the processing unit 10, a communication module, and other components. As described above, the server device 3 is configured to readily communicate with the plurality of sensing units 2 and the control module 50 of the air conditioning system 5. The server device 3 is installed in a caretaker's room in a facility, for example, but may also be installed outside the facility.

As shown in FIG. 3, the server device 3 is also connected to the display unit 4 which is attached next to the server device 3. The display unit 4 has a display screen, which may be a liquid crystal display, for example. The image information generated by the server device 3 may be displayed as output data on the display unit 4.

The processing unit 10 includes a computer system including, for example, a processor and a memory. The computer system performs the function of the processing unit 10 by making the processor execute a program stored in the memory. In this embodiment, the program to be executed by the processor is stored in advance in the memory of the computer system. However, this is only an example and should not be construed as limiting. The program may also be distributed after having been stored in a non-transitory storage medium such as a memory card or downloaded via a telecommunications line such as the Internet.

The processing unit 10 stores, in its own memory, the address information of the plurality of sensing units 2 to manage. If the plurality of sensing units 2 are classified into a master device and slave devices, the processing unit 10 may make a classification of the master and slave devices based on the address information. The server device 3 may be configured to be ready to communicate only with the sensing unit 2 serving as the master device. In this case, the sensing unit 2 serving as the master device may collect various types of information from the sensing units 2 serving as the slave devices and output the information to the server device 3 along with its own information.

In this embodiment, the processing unit 10 calculates a spatial temperature distribution based on respective pieces of the first information and the second information acquired from the plurality of sensing units 2. The spatial temperature distribution is a three-dimensional temperature distribution which includes a component in the height direction with respect to the monitor space 100 between the ceiling 101 and the floor 102.

In short, the still thermal image information provided by each sensing unit 2 is information representing a two-dimensional temperature distribution defined by X- and Y-axes and corresponding to the sensing area R0 which is defined generally parallel to the floor 102, and is information including no components in the height direction (i.e., no Z-axis components). On the other hand, the processing unit 10 calculates, based on the first information and the second information, a three-dimensional temperature distribution including a component in the height direction (i.e., a Z-axis component).

Specifically, pay, for example, attention to the sensing unit 2 (hereinafter referred to as a "sensing unit 2A") at the upper left corner in FIG. 5.

The processing unit 10 determines, based on the first information acquired from the sensing unit 2A, a temperature in a ceiling section area 104 (see FIG. 4) which faces the sensing area R0 within a unit space 100A for the sensing unit 2A, out of the overall planar area of the ceiling 101 in the monitor space 100. The temperature in the ceiling section area 104 will be hereinafter sometimes referred to as a "ceiling section temperature."

Furthermore, the processing unit 10 determines, based on the second information acquired from the sensing unit 2A, a temperature in a floor section area 105 (see FIG. 4) which faces the sensing area R0 within the unit space 100A for the sensing unit 2A, out of the overall area of the floor 102 in the monitor space 100. The temperature in the floor section area 105 will be hereinafter sometimes referred to as "floor section temperature." The floor section temperature is calculated based on the second information (information about the quantities of the infrared radiation received) and the first information (absolute temperature). Nevertheless, the second information acquired from the sensing unit 2A includes multiple pieces of information about the respective quantities of the infrared radiation received which are collected from respective unit subareas defined by dividing the sensing area R0 into 4×4 units. Therefore, the processing unit 10 calculates temperatures respectively corresponding to sixteen subdivided areas 105A defined by dividing the floor section area 105 into sixteen subareas (i.e., calculates sixteen temperatures in total).

Figure 4:
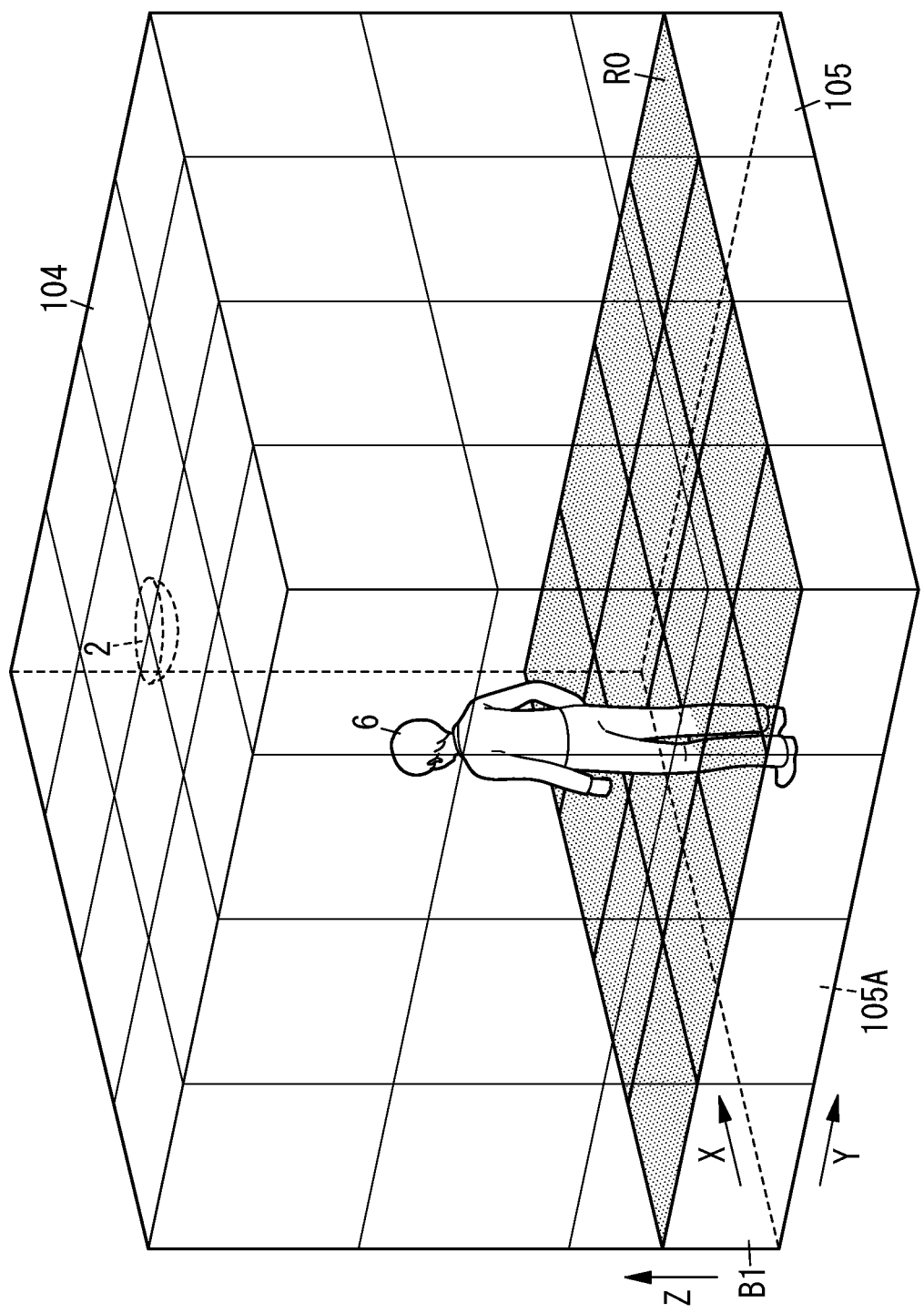
FIG. 4 is a conceptual diagram of a three-dimensional spatial temperature distribution calculated by the temperature sensing system.

The processing unit 10 calculates a three-dimensional temperature distribution by dividing a range defined in the height direction between the ceiling section area 104 and the floor section area 105 into three subranges, for example (see FIG. 4). Specifically, the processing unit 10 calculates temperatures respectively corresponding to forty-eight blocks B1 in total, which are defined by dividing the three-dimensional space between the ceiling section area 104 and the floor section area 105 into 16×3 blocks B1. The number of divisions corresponding to the subranges defined in the height direction is not limited to three, but may also be two, or four, or more.

The processing unit 10 estimates a temperature in the height direction, i.e., a temperature $T_c$ at a certain height from the floor section area 105, by using, for example, a mathematical equation ($T_c=a\times T_a+b\times T_b+c$), where a, b, and c are appropriate coefficients. Any of these coefficients may vary depending on a given height position in the height direction. Ta in the mathematical equation is a ceiling section temperature and is commonly used when temperatures $T_c$ at respective height positions are estimated. $T_b$ in the mathematical equation is a temperature corresponding to one of the subdivided areas 105A of the floor section area 105. Note that this mathematical equation is only an example and should not be construed as limiting.

The processing unit 10 calculates a plurality of temperatures $T_c$ by changing the height position within the range in the height direction (i.e., Z-axis) with respect to each block B1, and thereby determines the average of the plurality of temperatures $T_c$ thus calculated to be the temperature of the block B1. In this manner, the processing unit 10 calculates a spatial temperature distribution between the ceiling section area 104 and the floor section area 105 corresponding to the sensing unit 2A. The processing unit 10 calculates the spatial temperature distribution between the ceiling section area 104 and the floor section area 105 in the same way with respect to each of the other five sensing units 2. Consequently, the processing unit 10 may calculate a three-dimensional spatial temperature distribution of the entire monitor space 100.

(2.4) Description of Operation

An exemplary operation of the temperature sensing system 1 will be described by taking a temperature control of the air conditioning system 5 as an example.

The temperature sensing system 1 has, for example, the function of sensing an object within the monitor space 100 (hereinafter referred to as an "object sensing function"). However, the object sensing function is not an essential function for the temperature sensing system 1 but may be omitted as appropriate.

The temperature sensing system 1 determines, based on the respective pieces of still thermal image information (image data) provided by each sensing unit 2, whether a target 6 (which is supposed to be a person who may or may not be present within the monitor space 100) is present there or not. Specifically, the temperature sensing system 1 acquires, for example, when deciding that the target 6 should be absent from the monitor space 100, the captured image data as background data and stores the background data in a storage unit such as a nonvolatile memory. This storage unit may be a memory included in the control circuit within each sensing unit 2 or may also be a memory included in the processing unit 10 of the server device 3.

The temperature sensing system 1 generates, when performing temperature control on the air conditioning system 5, image data based on the second information detected by the second detector 22. Then, the temperature sensing system 1 compares the image data with the background data which is stored in advance. The temperature sensing system 1 determines, based on the comparison result, whether or not the target 6 is present within the monitor space 100. In the image data, a temperature value (pixel value) of the pixel corresponding to the target 6 within the monitor space 100 is greater than a threshold value. If the temperature value of the pixel exceeds the threshold value, a decision is made that at least a part of the target 6 should be present in the section area corresponding to the pixel.

If the temperature sensing system 1 decides that a person (target 6) should be absent from the monitor space 100, the temperature sensing system 1 has the control module 50 perform various types of control such as switching the operation mode of the air conditioner 51 to a power saving mode or stopping the operation of the air conditioner 51.

In addition, the temperature sensing system 1 may sense, based on the image data generated by each sensing unit 2, not only the presence or absence of a person (target 6) but also the location(s) (coordinates) and the number of persons (number of people) present within the monitor space 100. Thus, the temperature sensing system 1 makes the control module 50 perform, according to the location(s) and number of persons present there, the control to change the airflow direction or airflow volume of the air conditioner 51.

In this case, the temperature sensing system 1 according to this embodiment may also provide, by calculating the three-dimensional spatial temperature distribution of the entire monitor space 100 as described above, the temperature information about the component in the height direction for the air conditioning system 5. If a person (target 6) is present within a certain unit space 100A, the temperature in two blocks B1 arranged in the Z-axis, for example, may be calculated as a value higher than any of the temperatures respectively corresponding to the surrounding blocks B1 in the X- or Y-axis direction.

Moreover, the temperature sensing system 1 may also estimate the height, posture such as a standing position or a sitting position, a moving direction, and/or any other parameter of a person (target 6), based on the size of the area occupied by the person (target 6) within an area of the two-dimensional still thermal image. The temperature sensing system 1 may estimate the temperature corresponding to each block B1, by appropriately adjusting the coefficients of the above mathematical equation based on the estimated situation of the person (target 6).

Furthermore, the processing unit 10 of the temperature sensing system 1 also generates stereoscopic image data corresponding to the spatial temperature distribution thus calculated and has the image data displayed on the display unit 4. The processing unit 10 displays, for example, a temperature-based color distribution by changing the color (e.g., red, orange, yellow, green, blue, and so on, in descending order of temperature) on a block B1 by block B1 basis. The user (e.g., a caretaker of a facility) may visually learn about the temperature circumstance within the monitor space 100 by checking the stereoscopic image data through the display unit 4.

In this manner, the temperature sensing system 1 according to this embodiment may increase the accuracy in sensing the temperature in the monitor space 100 by calculating, based on the first information and the second information, the spatial temperature distribution that includes the component in the height direction.

In short, the inventors of the present disclosure paid attention to the following fact. Specifically, the present inventors paid special attention to the fact that the temperature within the monitor space 100 would significantly affect variations in the temperature on the floor 102 and the temperature on the ceiling 101. The present inventors confirmed that this was true even in, for example, a situation where a heat source (e.g., fixed heat source such as a television receiver) such as a person was present within the monitor space 100. For example, the infrared radiation emitted from a human body would affect the temperature variations of the floor 102 and the ceiling 101. In addition, heat would also conduct from the feet of a person to the floor 102 to affect the temperature variation of the floor 102. Furthermore, heat would also rise as an air flow from a person's head to affect the temperature variation of the ceiling 101. Therefore, the temperature sensing system 1 calculates (or estimates), based on the temperatures on the floor 102 and the ceiling 101, a spatial temperature distribution including the component in the height direction, thereby achieving the advantage of increasing the accuracy in sensing the temperature in the monitor space 100. For example, the temperature sensing system 1 may more accurately estimate the circumstances in the monitor space 100 such as a sense of hotness and coldness of a person (target 6) present in the monitor space 100 and the presence or absence of a person (target 6) in/from the monitor space 100, and provide these types of information for an external device such as the air conditioning system 5. As used herein, the sense of hotness and coldness is the sense of heat and cold that a person feels.

The air conditioning system 5 may perform the temperature control, airflow direction control, and airflow rate control more appropriately based on the information about the spatial temperature distribution as provided by the temperature sensing system 1.

(3) Variations

Note that the embodiment described above is only an exemplary one of various embodiments of the present disclosure and should not be construed as limiting. Rather, the embodiment may be readily modified in various manners depending on a design choice or any other factor without departing from the scope of the present disclosure. The functions of the temperature sensing system 1 according to the embodiment described above may also be implemented as a processing method for the temperature sensing system 1, a computer program or a non-transitory storage medium on which the computer program is stored, for example.

Next, variations of the exemplary embodiment will be enumerated one after another. The variations to be described below may be adopted in combination as appropriate. In the following description, the exemplary embodiment described above will be hereinafter sometimes referred to as a "basic example."

The processing unit 10 of the temperature sensing system 1 according to the present disclosure includes a computer system. The computer system includes a processor and a memory as principal hardware components. The functions of the processing unit 10 of the temperature sensing system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Also, in the embodiment described above, a plurality of constituent elements (or the functions) of the temperature sensing system 1 are integrated together in a single housing. However, this is not an essential configuration for the temperature sensing system 1. Alternatively, those constituent elements (or functions) of the temperature sensing system 1 may be distributed in multiple different housings. Still alternatively, at least some functions of the temperature sensing system 1 (e.g., some functions of the temperature sensing system 1) may be implemented as a cloud computing system as well. Conversely, a plurality of functions of the temperature sensing system 1 may be integrated together in a single housing.

In particular, in the basic example, the processing unit's 10 function of calculating the spatial temperature distribution is performed by the server device 3 which is provided separately from the plurality of sensing units 2 but may also be performed by any other device, instead of the server device 3. Specifically, the processing unit's 10 function of calculating the spatial temperature distribution may be performed by each sensing unit 2. For example, each sensing unit 2 may calculate only the spatial temperature distribution between the ceiling section area 104 and the floor section area 105 corresponding to itself, and transmit the information thus obtained to the server device 3. The server device 3 may calculate the spatial temperature distribution of the entire monitor space 100 based on the spatial temperature distribution received from each sensing unit 2.

Alternatively, if the plurality of sensing units 2 are classified into one master device and a plurality of slave devices, the processing unit's 10 function of calculating the spatial temperature distribution may be performed only by the sensing unit 2 serving as the master device.

(3.1) First Variation: Wall Temperature

A first variation of the temperature sensing system 1 will be described with reference to FIG. 6. Note that in the following description, any constituent element of the temperature sensing system 1 according to this first variation, having substantially the same function as a counterpart of the temperature sensing system 1 of the basic example described above, will be designated by the same reference numeral as that counterpart's, and description thereof will be omitted as appropriate herein.

As shown in FIG. 5, in the basic example, the arrangement of the six sensing units 2 with respect to the ceiling 101 is defined so that all sensing areas R0 of the six sensing units 2 fall inside the walls 103 surrounding the monitor space 100.

Figure 6:
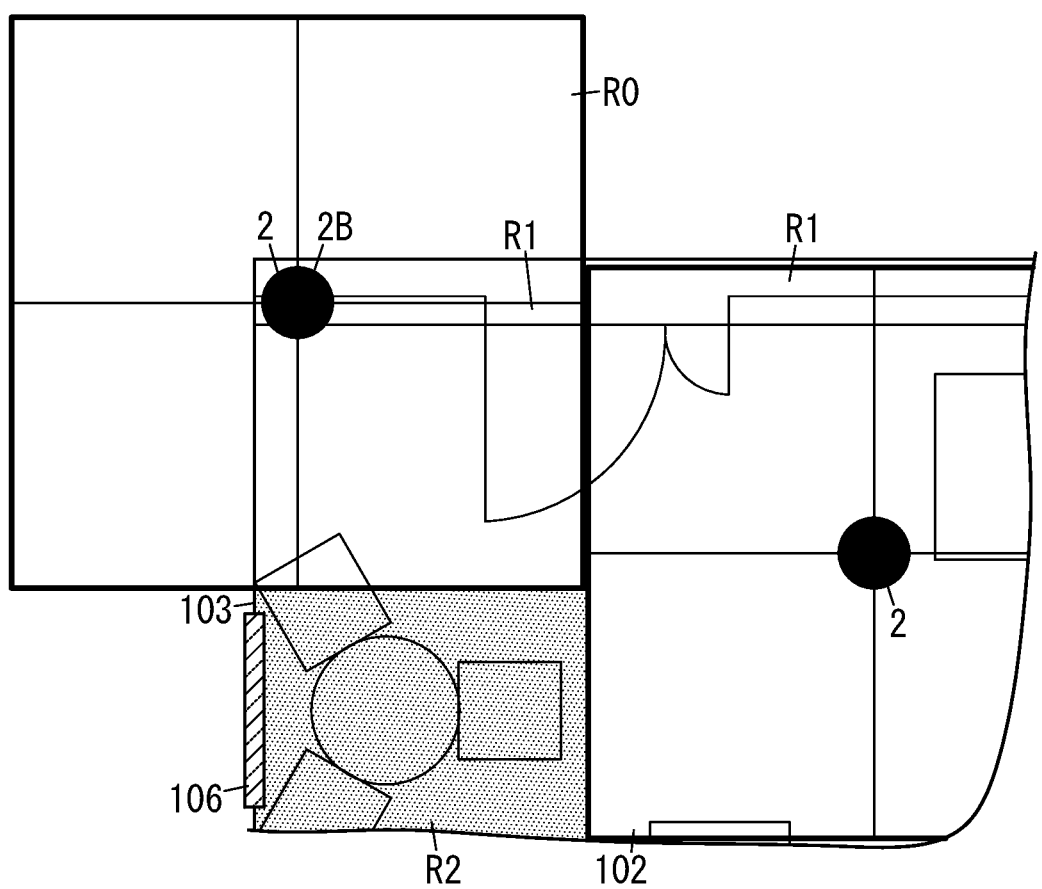
FIG. 6 is a conceptual diagram (partial floor plan) illustrating a case where a plurality of sensing units according to a first variation of the temperature sensing system are installed in the monitor space.

On the other hand, as shown in FIG. 6, in the temperature sensing system 1 according to the first variation, the sensing area R0 of at least one sensing unit 2 out of the plurality of sensing units 2 has its arrangement defined to partially protrude out of the walls 103, which is a difference from the basic example. In other words, at least one sensing unit 2 out of the plurality of sensing units 2 is installed at a point on the ceiling 101 to be located beside the walls 103. This sensing unit 2 will be hereinafter referred to as a "sensing unit 2B."

In the first variation, the second detector 22 of the sensing unit 2B is configured to detect infrared radiation emitted from the walls 103 surrounding the monitor space 100 and further output third information about the infrared radiation. That is to say, the sensing unit 2B outputs the third information, in addition to the first information and the second information of the basic example, to the server device 3.

After classifying the information provided into the second information and the third information, the control circuit of the sensing unit 2B may output these two types of information to the server device 3. Specifically, the control circuit of the sensing unit 2B may estimate the location of the walls 103 based on the two-dimensional still thermal image information (image data), and output the third information about the quantity of the infrared radiation received at the location of the walls 103 to the server device 3. The sensing unit 2B may hold information, based on the ON/OFF state of a dip switch, for example, about whether or not its installation location is beside the walls 103. This reduces an erroneous detection of the walls 103 and further increases the accuracy in classifying the information provided into the second information and the third information.

Alternatively, the sensing unit 2B may output the information about the quantity of the infrared radiation received to the server device 3 as it is without classifying the information provided into the second information and the third information, and the processing unit 10 of the server device 3 may perform the classification.

When the server device 3 performs the above-described classification, the processing unit 10 of the server device 3 may store correspondence information, in which the address information of each sensing unit 2 and information about the mounting position thereof on the ceiling 101 are associated with each other. The processing unit 10 may decide, based on the address information included in the information acquired from the sensing unit 2, that the sensing unit 2 should be the sensing unit 2B installed beside the wall 103. Based on this decision, the processing unit 10 may further increase the estimation accuracy of the temperature of the walls 103 by performing the classification of the second information and the third information based on the two-dimensional image data acquired from the sensing unit 2B.

The processing unit 10 calculates the temperature on a wall 103 based on the third information and the first information. The processing unit 10 calculates the spatial temperature distribution that includes the component in the height direction while taking the temperature on the walls 103 into account. Specifically, if the processing unit 10 obtains the temperature of the block B1 beside a wall 103, the above mathematical equation may include, for example, a coefficient corresponding to the temperature on the wall 103.

According to the configuration of the first variation, the spatial temperature distribution is calculated based on the first information to the third information, which allows the accuracy in sensing the temperature in the monitor space 100 to be further increased.

Meanwhile, as in the example of FIG. 6, there may be an area falling outside of the sensing area R0 with respect to the floor 102 of the monitor space 100. The following description will be focused on this area.

In other words, the floor 102 may include a first area R1 in which the second detector 22 may detect infrared radiation and a second area R2. The first area R1 substantially corresponds to the sensing area R0 of one or the plurality of sensing units 2. The second area R2 is an area other than the first area R1 and is adjacent to the first area R1. The second area R2 is an area in which no infrared radiation can be detected by any of the sensing units 2.

The second area R2 is highly likely to be set beside the window 106 if there is a window 106 (e.g., or a door) in the monitor space 100, for example. That is to say, if the sensing unit 2 is installed on the ceiling 101 to be located beside the window 106, the thermal image information may be affected by direct sunlight from the sun (as a disturbance), thus possibly causing an erroneous detection of a person (target 6). Therefore, the sensing unit 2 may sometimes be installed so as to avoid the window 106.

Thus, in the temperature sensing system 1 according to the first variation, the processing unit 10 is further configured to calculate the spatial temperature distribution by complementing the information about the temperature in the second area R2 with additional information. That is to say, the processing unit 10 has a temperature complementing function with respect to an area in which no infrared radiation can be detected by the sensing unit 2.

Specifically, the server device 3 is configured to acquire information about an external factor. The external factor may include, for example, at least one factor selected from the group consisting of an outside air temperature, the amount of insolation (which may also be the amount of solar radiation), the wind velocity of the outside air, the open/closed state of the window 106, and the open/closed state of a window shutter.

The server device 3 may acquire at least a part of the information about the external factor from an operating command entered by the user. Alternatively, the server device 3 may receive at least a part of the information about the external factor from a controller of a BEMS (Building Energy Management System), for example, which makes power management of an electrical device such as an electric window (window 106) and an electric window shutter. Still alternatively, the server device 3 may receive at least a part of the information about the external factor from an illuminance sensor, for example. Yet alternatively, the server device 3 may acquire at least a part of the information about the external factor from an external server (e.g., a server which provides weather information).

The processing unit 10 calculates, by adding a coefficient corresponding to the information about the external factor to the above-described mathematical equation, the spatial temperature distribution that includes the component in the height direction. Note that the processing unit 10 decides, based on the first information and the second information provided by the sensing unit 2 which covers the sensing area R0 adjacent to the second area R2, the ceiling section temperature $T_a$ and the floor section temperature $T_b$ corresponding to the second area R2.

As described above, by providing the processing unit 10 with the complementing function, the number of second detectors 22 provided may be reduced with the accuracy in sensing the temperature in the monitor space 100 maintained.

(3.2) Second Variation: Overlapping Area

The temperature sensing system 1 according to a second variation will be described with reference to FIGS. 7A-7C. Note that in the following description, any constituent element of the temperature sensing system 1 according to this second variation, having substantially the same function as a counterpart of the temperature sensing system 1 of the basic example described above, will be designated by the same reference numeral as that counterpart's, and description thereof will be omitted as appropriate herein.

Figure 7A:
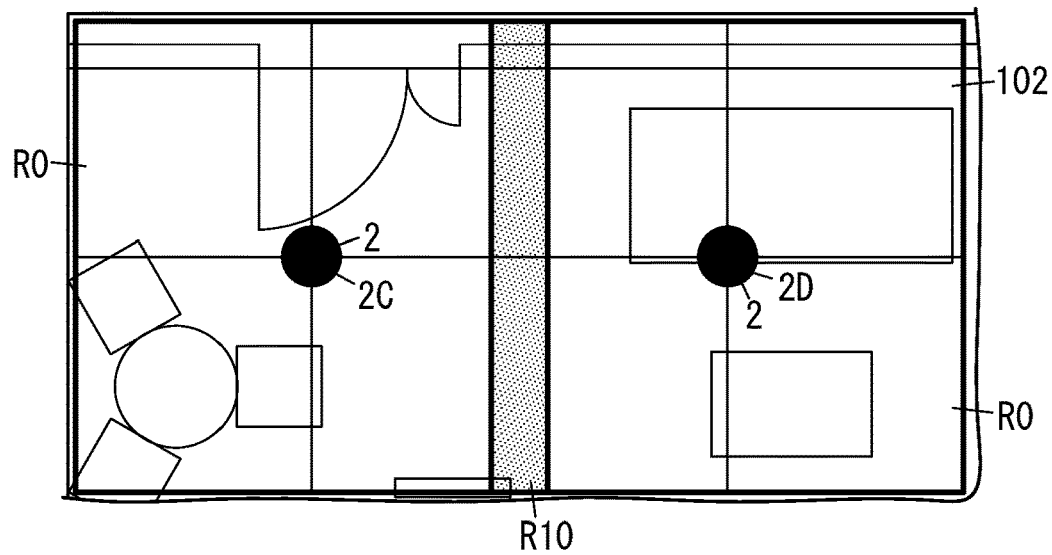
FIGS. 7A-7C are conceptual diagrams illustrating a second variation of the temperature sensing system.
Figure 7B:
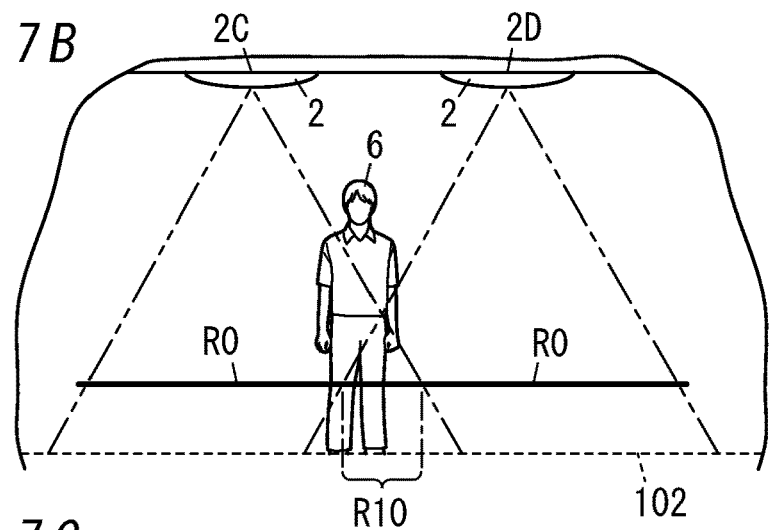

FIG. 7A is a partial floor plan of only a part of the monitor space 100 and shows only two representative sensing units 2 (hereinafter referred to as "sensing unit 2C" and "sensing unit 2D," respectively) out of the plurality of sensing units 2.

As shown in FIG. 7A, in the temperature sensing system 1 according to the second variation, the sensing unit 2C and the sensing unit 2D located on the right of the sensing unit 2C are arranged so that their respective two-dimensional sensing areas R0 partially overlap with each other (in an overlapping area R10). In other words, in the second variation, the sensing unit 2C and the sensing unit 2D are arranged so that their respective fields of view partially overlap with each other, which is another difference from the basic example.

In FIG. 7A, the respective sensing areas R0 of the two sensing units 2 that are adjacent to each other in a lateral direction partially overlap with each other. Alternatively, the respective sensing areas R0 of two sensing units 2 which are adjacent in a longitudinal direction may also be arranged to partially overlap with each other. Still alternatively, the respective sensing areas R0 of two sensing units 2 which are diagonally (or obliquely) adjacent to each other may also be arranged to partially overlap with each other.

In this embodiment, as shown in FIG. 1B, the sensing area R0 of each sensing unit 2 corresponds to the bottom of the three-dimensional field of view range (in a quadrangular pyramidal shape). Therefore, if two adjacent sensing units 2 are arranged so that the edges of their respective sensing areas R0 are aligned with each other as shown in FIG. 5 representing the basic example and a person (target 6) is present on a boundary between the two adjacent sensing units 2, the person (target 6) who is present there may not fall within the three-dimensional field of view range.

In contrast, in the temperature sensing system 1 according to the second variation, providing the overlapping area R10 increases the chances of a person (target 6) falling within the three-dimensional field of view range of the two adjacent sensing units 2 as shown in 7B. Therefore, the temperature in the height direction may be detected more accurately. In particular, the height, the posture, the moving direction, and/or any other parameter of a person (target 6) who is present within the monitor space 100 may be sensed by the temperature sensing system 1 more accurately.

Moreover, if the respective image data acquired from the two adjacent sensing units 2 are compared with each other, the numbers of the pixels exceeding the threshold value may be uneven between the two image data even if the sensed target 6 is the same person. For example, as shown in FIG. 7B, if the person (target 6) is standing at a location closer to the left end within the overlapping area R10, the number of pixels exceeding the threshold value in the image data acquired from the sensing unit 2C may be greater than the number of pixels exceeding the threshold value in the image data acquired from the sensing unit 2D. By estimating the circumstance of the person (target 6) based on this unevenness, the temperature in the height direction may be sensed more accurately.

Figure 7C:
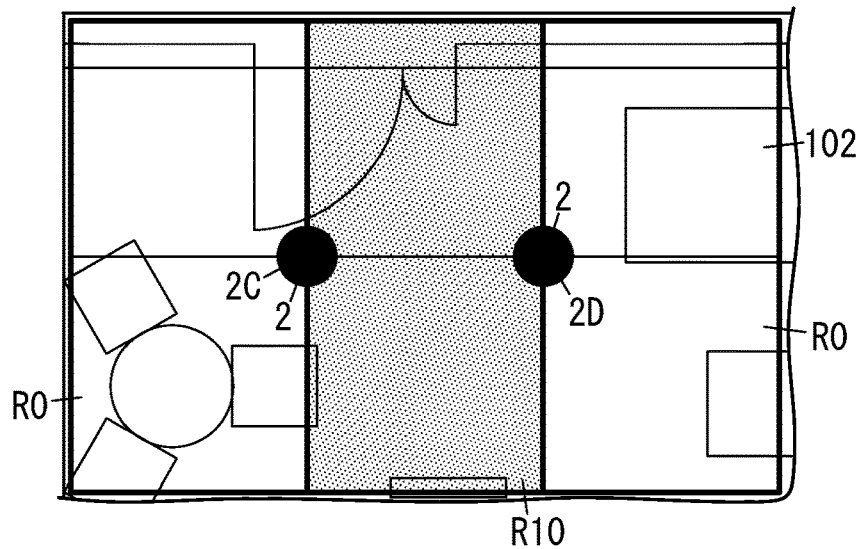

As another example of the second variation, as shown in FIG. 7C, the sensing unit 2C and the sensing unit 2D may be arranged such that respective halves of their sensing areas R0 overlap with each other. Alternatively, the overlapping area may be larger than a half of each of their sensing areas R0. In this manner, by having the overlapping area R10 cover a half of the sensing area R0, the temperature in the height direction may be sensed more accurately with the increase in the number of the sensing units 2 reduced.

(3.3) Other Variations

In the basic example, the second detector 22 of each sensing unit 2 is implemented as an infrared array sensor in which sixty-four sensor elements are two-dimensionally arranged to form an 8×8 square array in which eight sensor elements are arranged along both of the X- and Y-axes. However, the second detector 22 of each sensing unit 2 is not limited to an array sensor. That is to say, the number and the arrangement of the sensor elements of the second detector 22 are not limited, but the number of the sensor elements provided may be one, for example.

Note that the sensor elements of the second detector 22 do not have to be thermopiles, but may also be any other suitable elements such as resistance bolometers or pyroelectric elements, for example.

Figure 8:
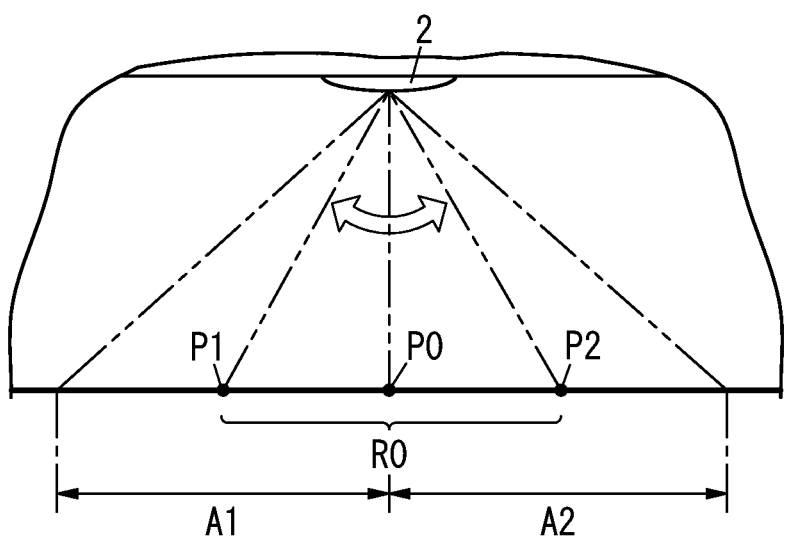
FIG. 8 is a conceptual diagram illustrating another variation of the temperature sensing system.

In the basic example, the center of the two-dimensional sensing area R0 of infrared radiation is defined at a certain location, in a state where each sensing unit 2 is installed on the ceiling 101. However, at least one of the plurality of sensing units 2 may be swingable so that the center of the sensing area R0 thereof is displaced from a first point (e.g., origin P0) to a second point (point P1 or point P2) (see FIG. 8). The sensing unit 2 may further include an actuator (including a motor, for example) which is controlled by the control unit 25. The actuator supports each sensor module 20 to allow the sensor module 20 to swing. The actuator changes the sensing areas R0 from a first sensing area A1 to a second sensing area A2, and vice versa, by making the sensor module 20 perform a swing motion in response to a drive signal received from the control unit 25. In this case, the four sensor modules 20 may swing individually or swing in synch with each other. According to this configuration, the number of sensing units 2 (second detectors 22) provided may be reduced with the accuracy in sensing the temperature in the monitor space 100 maintained.

The swing motion described above may be applied to a case where the sensing unit 2 installed beside the walls 103 according to the first variation detects infrared radiation emitted from the wall 103. This allows the temperature on the walls 103 to be estimated more accurately.

In the basic example, the first detector 21 is implemented as a temperature sensor including a temperature detecting element such as a thermistor. The first detector 21 detects the temperature within the housing 23 and uses the temperature as the temperature on the ceiling 101 (first information). However, the first detector 21, as well as the second detector 22, may also be an infrared detector for detecting infrared radiation. Specifically, the first detector 21 may be an infrared array sensor in which a plurality of sensor elements (e.g., thermopiles) are arranged two-dimensionally. In that case, in a state where the sensing unit 2 is installed on the ceiling 101, the first detector 21 has its photosensitive surface arranged to be tilted with respect to a horizontal plane and face the ceiling 101, and detects infrared radiation emitted from the ceiling 101. Moreover, in that case, the sensing unit 2 may further include a temperature sensor for detecting an absolute temperature within the sensor module 20, and/or may acquire information about an absolute temperature detected by a temperature sensor which is separately installed outside the sensing unit 2 (e.g., may be directly installed on the ceiling 101). Still alternatively, information about an absolute temperature detected by another sensing unit 2 which has the same configuration as the one described for the basic example may be shared. In short, the temperature sensor that detects the absolute temperature may be located inside the sensing unit 2, outside the sensing unit 2, or somewhere else, as long as the temperature sensor is configured to be able to acquire information about the absolute temperature. The first detector 21 calculates the temperature on the ceiling 101 based on the quantity of the infrared radiation received from the ceiling 101 and the absolute temperature, and outputs the first information about the temperature to the server device 3. Alternatively, if the sensing unit 2 includes the actuator as described above, at least one of the four sensor modules 20 may perform the swing motion so that the center of the sensing area R0 thereof overlaps with the ceiling 101. In other words, at least one of the four second detectors 22 may function as the first detector 21.

Nevertheless, if the sensing unit 2 includes a temperature sensor for detecting the temperature within the housing 23 as an absolute temperature, the sensing unit 2 may be formed at a lower cost by applying the temperature sensor to the first detector 21 as in the basic example.

The processing unit 10 of the server device 3 or the control unit 25 of the sensing unit 2 according to the basic example may further include an estimation unit for estimating a sense of hotness and coldness of a person.

Specifically, the sense of hotness and coldness may be represented by an index such as Predicted Mean Vote (hereinafter referred to as "PMV"). The PMV is defined by taking, for example, temperature, humidity, airflow, thermal radiation, metabolic rate, and clothing level into account.

The estimation unit estimates the sense of hotness and coldness of a person by detecting the skin temperature of his or her part exposed from his or her clothes based on, for example, the still thermal image information (image data). It is known that, depending on a part of a human body, the skin temperature of that part has high correlation with the sense of hotness and coldness. A nose may be given as an example of such a part having a high correlation with the sense of hotness and coldness. Alternatively, a value obtained by subtracting the skin temperature of a nose from the skin temperature of a forehead also shows a high correlation with the sense of hotness and coldness.

The estimation unit may obtain, based on image data, a skin temperature of a part for use to estimate the sense of hotness and coldness and estimate the sense of hotness and coldness based on the result. Note that the method for estimating the sense of hotness and coldness is not limited to this method. Alternatively, the estimation unit may calculate, based on the image data, a temperature difference between a person and the surroundings, calculate the quantity of heat emitted from the person, and then estimate a PMV based on the correlation between the quantity of heat emitted and the PMV.

(4) Recapitulation

As can be seen from the foregoing description, a temperature sensing system (1) according to a first aspect senses a temperature in a monitor space (100). The temperature sensing system (1) includes a first detector (21), a second detector (22), and a processing unit (10). The first detector (21) detects a temperature on a ceiling (101) and outputs first information about the temperature. The second detector (22) detects infrared radiation emitted from a floor (102) and outputs second information about the infrared radiation. The processing unit (10) calculates, based on at least the first information and the second information, a spatial temperature distribution which includes a component in a height direction with respect to the monitor space (100) between the ceiling (101) and the floor (102). According to the first aspect, a spatial temperature distribution including a component in the height direction is calculated based on at least the first information and the second information, thus contributing to increasing accuracy in sensing the temperature in the monitor space (100).

In a temperature sensing system (1) according to a second aspect, which may be implemented in conjunction with the first aspect, the second detector (22) detects infrared radiation emitted from walls (103) surrounding the monitor space (100) and further outputs third information about the infrared radiation. The processing unit (10) calculates the spatial temperature distribution based on the third information, in addition to the first information and the second information. The second aspect may further increase the accuracy in sensing the temperature in the monitor space (100) by calculating the spatial temperature distribution based on the first information to the third information.

A temperature sensing system (1) according to a third aspect, which may be implemented in conjunction with the first or second aspect, further includes a housing (23) mounted on the ceiling (101) and housing or holding at least the first detector (21) and the second detector (22). The first detector (21) is implemented as a temperature sensor for detecting a temperature in the housing (23) as the temperature on the ceiling (101). The third aspect allows the temperature sensing system (1) to be formed at a lower cost, compared to having the temperature on the ceiling (101) detected by the first detector (21) based on, for example, the infrared radiation emitted from the ceiling (101).

A temperature sensing system (1) according to a fourth aspect, which may be implemented in conjunction with any one of the first to third aspects, further includes a housing (23) which houses or holds at least the first detector (21) and the second detector (22). The housing (23) forms a sensing unit (2) along with the first detector (21) and the second detector (22). The temperature sensing system (1) includes a plurality of the sensing units (2). The processing unit (10) calculates the spatial temperature distribution based on at least the first information and the second information provided by the plurality of sensing units (2). According to the fourth aspect, the temperature sensing system (1) includes a plurality of sensing units (2), and therefore, may cover a broader monitor space (100).

In a temperature sensing system (1) according to a fifth aspect, which may be implemented in conjunction with the fourth aspect, at least two sensing units (2) out of the plurality of sensing units (2) are arranged as follows. Specifically, the at least two sensing units (2) are arranged so that their respective two-dimensional sensing areas (R0) of the infrared radiation detected by the respective second detectors (22) at least partially overlap with each other. According to the fifth aspect, the temperature in the height direction may be detected more accurately.

In a temperature sensing system (1) according to a sixth aspect, which may be implemented in conjunction with the fifth aspect, the at least two sensing units (2) are arranged so that respective halves, or more than halves, of their sensing areas (R0) overlap with each other. According to the sixth aspect, the temperature in the height direction may be detected more accurately with the increase in the number of the sensing units (2) reduced.

In a temperature sensing system (1) according to a seventh aspect, which may be implemented in conjunction with any one of the first to sixth aspects, the second detector (22) is swingable so that a center of the two-dimensional sensing area (R0) of the infrared radiation is displaced from a first point to a second point. According to the seventh aspect, the number of second detectors (22) provided may be reduced with the accuracy in sensing the temperature in the monitor space (100) maintained.

In a temperature sensing system (1) according to an eighth aspect, which may be implemented in conjunction with any one of the first to seventh aspects, the floor (102) includes a first area (R1) in which the second detector (22) is able to detect the infrared radiation, and a second area (R2). The second area (R2) is an area other than the first area (R1) and adjacent to the first area (R1). The processing unit (10) calculates the spatial temperature distribution by complementing information about a temperature in the second area (R2) with additional information. According to the eighth aspect, the number of second detectors (22) provided may be reduced with the accuracy in sensing the temperature in the monitor space (100) maintained.

A processing method according to a ninth aspect is a processing method for use to perform processing on a temperature distribution in a temperature sensing system (1) for sensing a temperature in a monitor space (100). The processing method includes a calculation step including calculating, based on at least first information and second information, a spatial temperature distribution which includes a component in a height direction with respect to the monitor space (100) between a ceiling (101) and a floor (102). The first information is detection information about a temperature on the ceiling (101). The second information is detection information about infrared radiation emitted from the floor (102). The ninth aspect provides a processing method which contributes to increasing accuracy in sensing a temperature in a monitor space (100).

A program according to a tenth aspect is designed to cause a computer system to perform the processing method according to the ninth aspect. The tenth aspect provides a function which contributes to increasing accuracy in sensing a temperature in a monitor space (100).

Note that the constituent elements according to the second to eighth aspects are not essential constituent elements for the temperature sensing system (1) but may be omitted as appropriate.

REFERENCE SIGNS LIST

1 Temperature Sensing System
10 Processing Unit
2 Sensing Unit
21 First Detector
22 Second Detector
23 Housing
100 Monitor Space
101 Ceiling
102 Floor
103 Wall
R0 Sensing Area
R1 First Area
R2 Second Area

The invention claimed is:

1. A temperature sensing system configured to sense a temperature in a monitor space, the temperature sensing system comprising:
a first detector configured to detect a temperature on a ceiling and output first information about the temperature on the ceiling;
a second detector configured to detect infrared radiation emitted from a floor and output second information about the infrared radiation from the floor;
a processing unit configured to calculate, based on at least the first information and the second information, a spatial temperature distribution which includes a component in a height direction with respect to the monitor space between the ceiling and the floor; and
a housing mounted on the ceiling and configured to house or hold at least the first detector and the second detector,
the first detector being implemented as a temperature sensor configured to detect a temperature in the housing as the temperature on the ceiling.

2. The temperature sensing system of claim 1, wherein the second detector is swingable so that a center of a two-dimensional sensing area of the infrared radiation is displaced from a first point to a second point.

3. The temperature sensing system of claim 1, wherein the floor includes: a first area in which the second detector is able to detect the infrared radiation; and a second area which is an area other than the first area and adjacent to the first area, and
the processing unit is configured to calculate the spatial temperature distribution by complementing information about a temperature in the second area with additional information.

4. The temperature sensing system of claim 1, wherein the second detector is configured to detect infrared radiation emitted from walls surrounding the monitor space and further output third information about the infrared radiation from the walls, and
the processing unit is configured to calculate the spatial temperature distribution based on the third information, in addition to the first information and the second information.

5. The temperature sensing system of claim 4, wherein the housing forms a sensing unit along with the first detector and the second detector,
the temperature sensing system includes a plurality of the sensing units, and
the processing unit is configured to calculate the spatial temperature distribution based on at least the first information and the second information provided by the plurality of sensing units.

6. The temperature sensing system of claim 1, wherein the housing forms a sensing unit along with the first detector and the second detector,
the temperature sensing system includes a plurality of the sensing units, and
the processing unit is configured to calculate the spatial temperature distribution based on at least the first information and the second information provided by the plurality of sensing units.

7. The temperature sensing system of claim 6, wherein at least two sensing units out of the plurality of sensing units are arranged so that their respective two-dimensional sensing areas of the infrared radiation detected by the respective second detectors at least partially overlap with each other.

8. The temperature sensing system of claim 7, wherein the at least two sensing units are arranged so that respective halves, or more than halves, of their sensing areas overlap with each other.

9. A temperature sensing system configured to sense a temperature in a monitor space, the temperature sensing system comprising:
a first detector configured to detect a temperature on a ceiling and output first information about the temperature on the ceiling;

a second detector configured to detect infrared radiation emitted from a floor and output second information about the infrared radiation from the floor; and a processing unit configured to calculate, based on at least the first information and the second information, a spatial temperature distribution which includes a component in a height direction with respect to the monitor space between the ceiling and the floor, the floor including: a first area in which the second detector is able to detect the infrared radiation; and a second area which is an area other than the first area and adjacent to the first area, and the processing unit being configured to calculate the spatial temperature distribution by complementing information about a temperature in the second area with additional information.

10. The temperature sensing system of claim 9, wherein the second detector is configured to detect infrared radiation emitted from walls surrounding the monitor space and further output third information about the infrared radiation from the walls, and the processing unit is configured to calculate the spatial temperature distribution based on the third information, in addition to the first information and the second information.

11. The temperature sensing system of claim 9, wherein the second detector is swingable so that a center of a two-dimensional sensing area of the infrared radiation is displaced from a first point to a second point.

12. The temperature sensing system of claim 9, further comprising a housing configured to house or hold at least the first detector and the second detector, wherein the housing forms a sensing unit along with the first detector and the second detector, the temperature sensing system includes a plurality of the sensing units, and the processing unit is configured to calculate the spatial temperature distribution based on at least the first information and the second information provided by the plurality of sensing units.

13. The temperature sensing system of claim 12, wherein at least two sensing units out of the plurality of sensing units are arranged so that their respective two-dimensional sensing areas of the infrared radiation detected by the respective second detectors at least partially overlap with each other.

14. The temperature sensing system of claim 13, wherein the at least two sensing units are arranged so that respective halves, or more than halves, of their sensing areas overlap with each other.

* * * * *